(12) United States Patent  
Williams, III

(10) Patent No.: US 8,881,760 B2
(45) Date of Patent: Nov. 11, 2014

(54) SPRING MOUNTING CRADLE AND VALVE GUIDE FOR OVERPRESSURE RELIEF VALVE ASSEMBLY

(76) Inventor: James W. Williams, III, Gwynedd, PA (US)

(*) Notice: Subject to any disclaimer, the term of this patent is extended or adjusted under 35 U.S.C. 154(b) by 177 days.

(21) Appl. No.: 13/403,084

(22) Filed: Feb. 23, 2012

(65) Prior Publication Data

US 2012/0216885 A1 Aug. 30, 2012

Related U.S. Application Data

(60) Provisional application No. 61/447,147, filed on Feb. 28, 2011.

(51) Int. Cl.
*F16K 15/00* (2006.01)
*F16K 27/02* (2006.01)
*F16K 17/04* (2006.01)

(52) U.S. Cl.
CPC .............. *F16K 27/0209* (2013.01); *F16K 15/00* (2013.01); *F16K 17/04* (2013.01); *F16K 17/0493* (2013.01)

USPC .......................................... 137/535; 251/337

(58) Field of Classification Search
CPC ....... F16K 1/33; F16K 15/06; F16K 17/0493; F01L 3/10
USPC ........... 137/529, 535, 536; 251/337; 248/200, 248/300, 303
See application file for complete search history.

(56) References Cited

U.S. PATENT DOCUMENTS

| 3,974,850 | A | * | 8/1976 | Pierson ........................ 137/493.9 |
| 5,855,225 | A |   | 1/1999 | Williams, III |
| 5,873,385 | A | * | 2/1999 | Bloom et al. ............. 137/543.19 |
| 6,422,530 | B1 | * | 7/2002 | Williams, III ................... 251/27 |
| 7,310,942 | B2 | * | 12/2007 | Shiga et al. ..................... 60/324 |
| 2003/0116685 | A1 | * | 6/2003 | Jensen .......................... 248/200 |

\* cited by examiner

*Primary Examiner* — John Rivell
*Assistant Examiner* — Angelisa Hicks
(74) *Attorney, Agent, or Firm* — Howson & Howson LLP

(57) ABSTRACT

A spring mounting cradle for an over-pressure valve assembly has integral valve-element camming surfaces provided adjacent the lower ends of a pair of the bent legs forming the cradle.

7 Claims, 4 Drawing Sheets

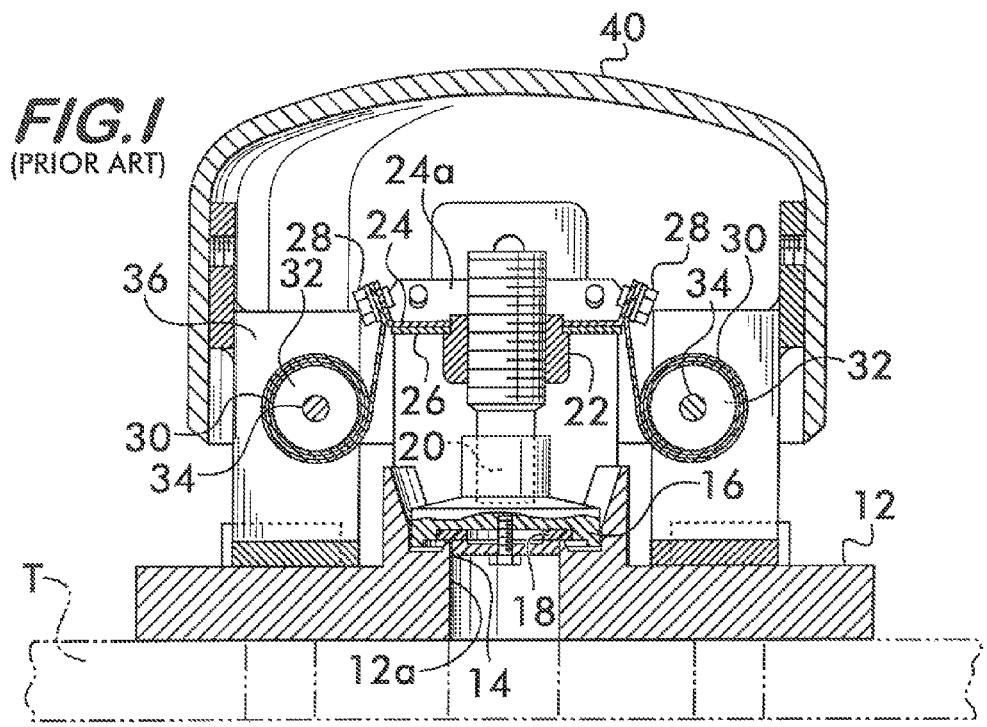
FIG. 1 (PRIOR ART)
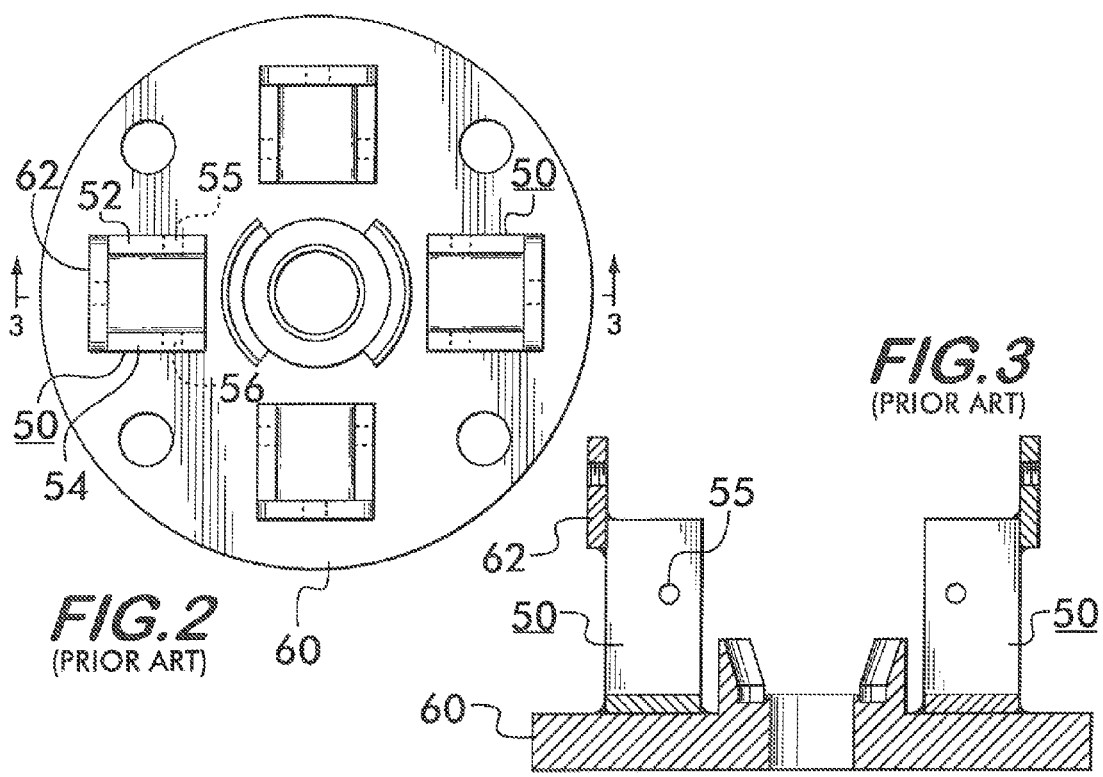
FIG. 2 (PRIOR ART)
FIG. 3 (PRIOR ART)

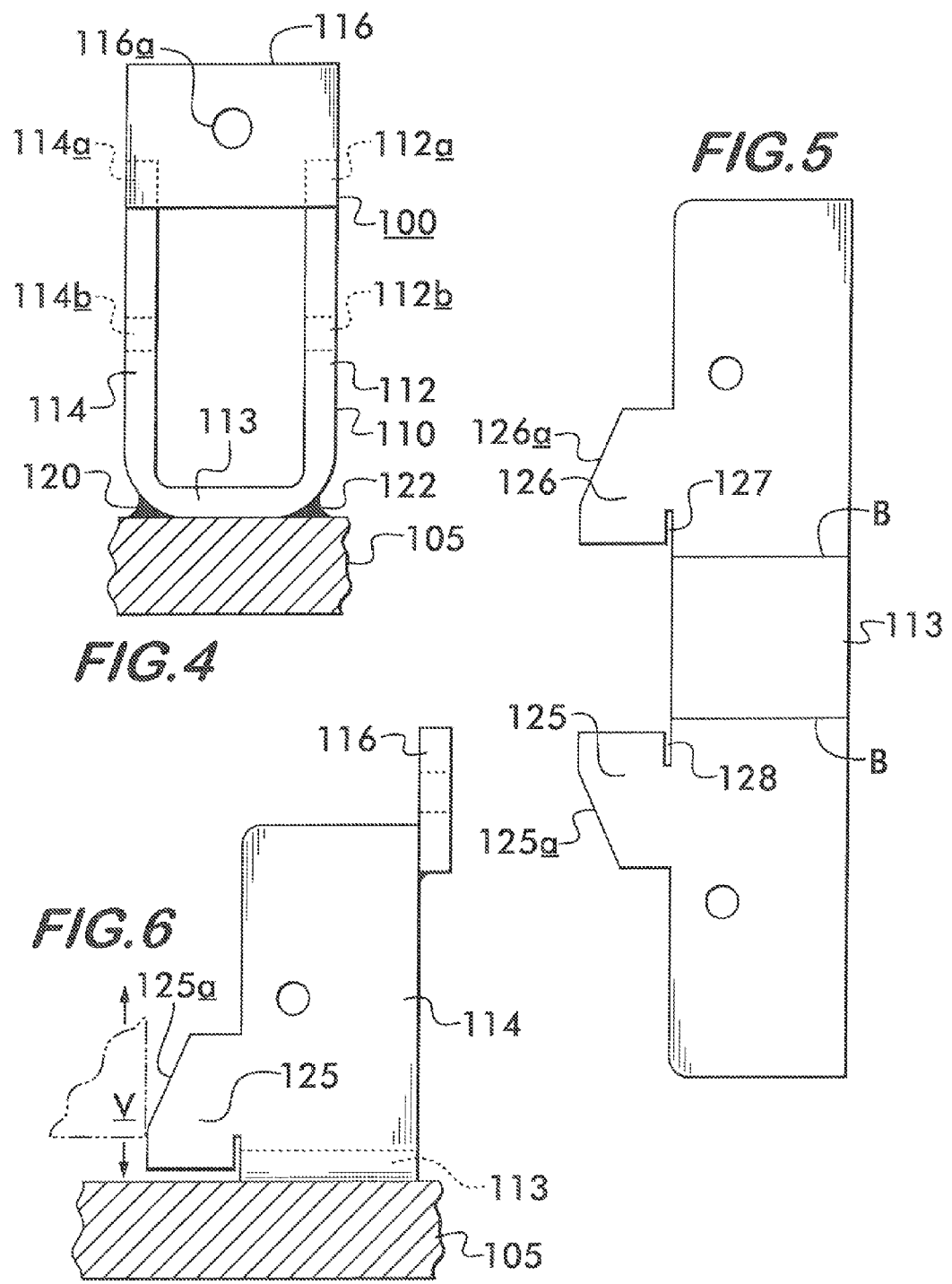

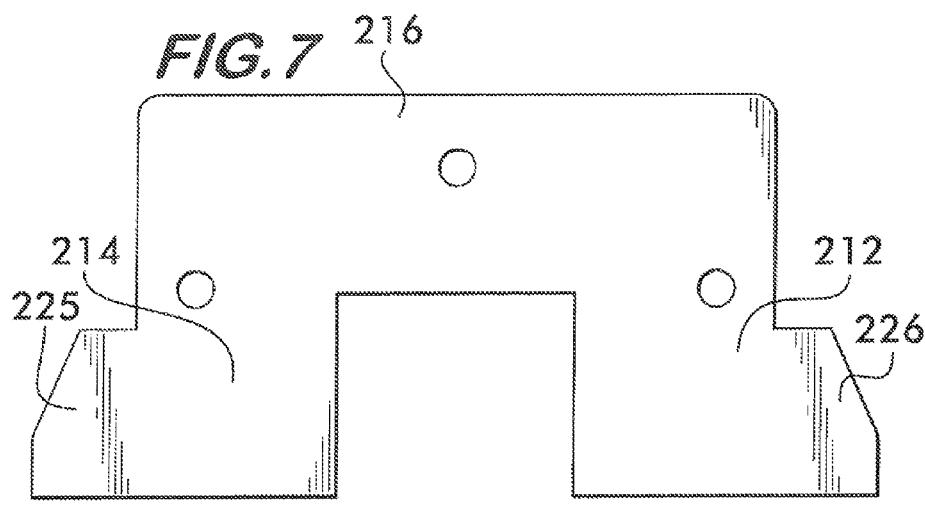
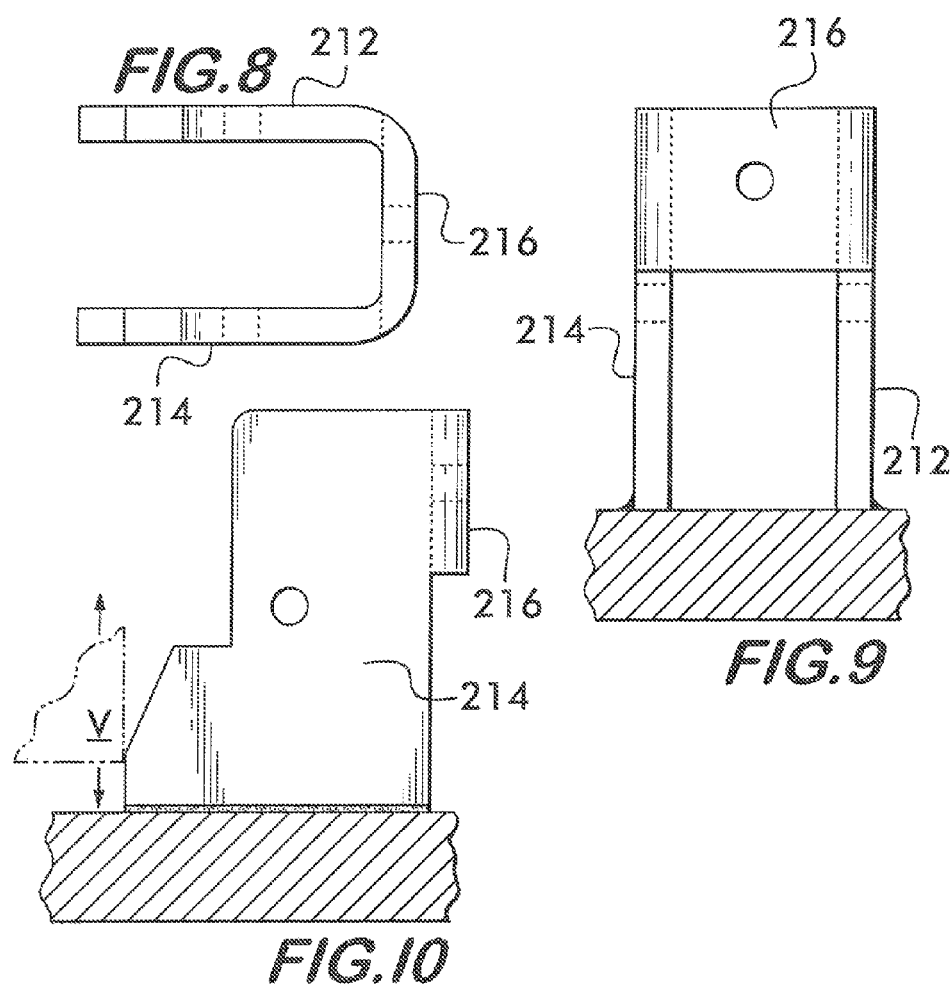
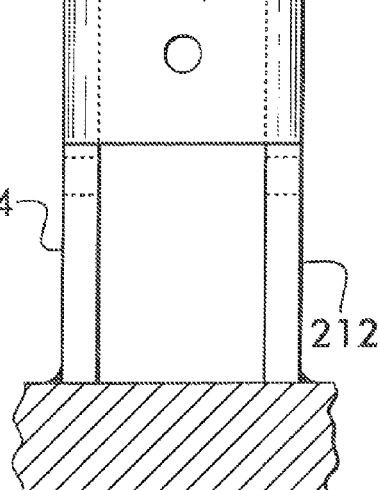
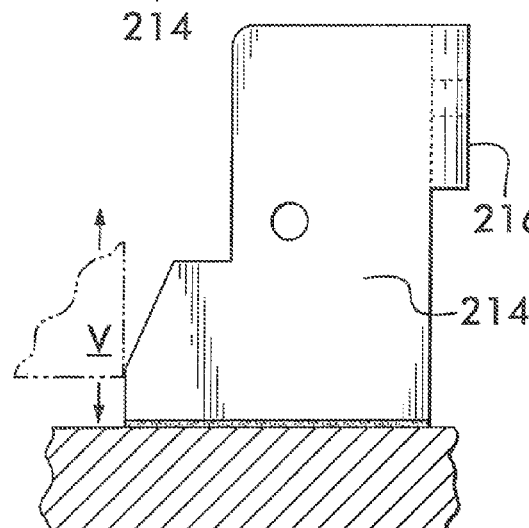

SPRING MOUNTING CRADLE AND VALVE GUIDE FOR OVERPRESSURE RELIEF VALVE ASSEMBLY

CROSS-REFERENCE TO RELATED APPLICATIONS

This application claims the benefit under 35 USC §119(e) of U.S. Provisional Patent Application No. 61/447,147 filed Feb. 28, 2011.

BACKGROUND AND SUMMARY OF THE INVENTION

This invention pertains to pressure relief valves of the type that are particularly suited for use on mobile tanks, such as railway tank cars.

U.S. Pat. No. 5,855,225 discloses a valve assembly that includes a base plate which carries a plurality of spring assemblies connected to a valve stem to permit a valve disc to open in response to overpressures.

In actual practice, such base plates have been cast of stainless steel to have precisely located mounting lugs for accurate placement of the spring assemblies. They also have cast opposed valve guides. Molding, and post-molding machining, necessary to form the valve guides, and to place the spring assemblies accurately, is expensive.

To reduce these costs, the present invention provides a valve plate of rolled stainless steel and a novel spring assembly bracket and valve guide that is particularly suited for being welded to the valve plate.

BRIEF DESCRIPTION OF THE DRAWINGS

FIG. 1 is a vertical cross-sectional view of the overpressure relief valve depicted in U.S. Pat. No. 5,855,225;

FIG. 2 is a schematic plan view of a portion of the prior art overpressure relief valve constructed in accord with the '225 Patent;

FIG. 3 is a schematic vertical sectional view taken on line 3-3 of FIG. 2 to illustrate a pair of opposed prior art spring mounting brackets;

FIG. 4 is a vertical elevational view of a spring mounting bracket of the present invention as it would be installed on a base plate such as shown in FIG. 2, but in place of the prior art bracket and cast valve guide;

FIG. 5 is a plan view of the spring mounting bracket and valve guide assembly blank prior to bending;

FIG. 6 is an enlarged view of a spring mounting bracket and valve guide assembly formed according to the present invention;

FIG. 7 is a plan view similar to FIG. 5, but of a modified embodiment of the present invention prior to bending;

FIG. 8 is a view looking downward on the blank of FIG. 7 after bending; blank used in forming the modified embodiment of the present invention;

FIG. 9 is a view similar to FIG. 4, but of the modified embodiment of the present invention in plane; and FIG. 10 is a vertical side elevational view, similar to FIG. 6, but showing the bracket welded in place.

DESCRIPTION OF PREFERRED EMBODIMENT

Figure 11:
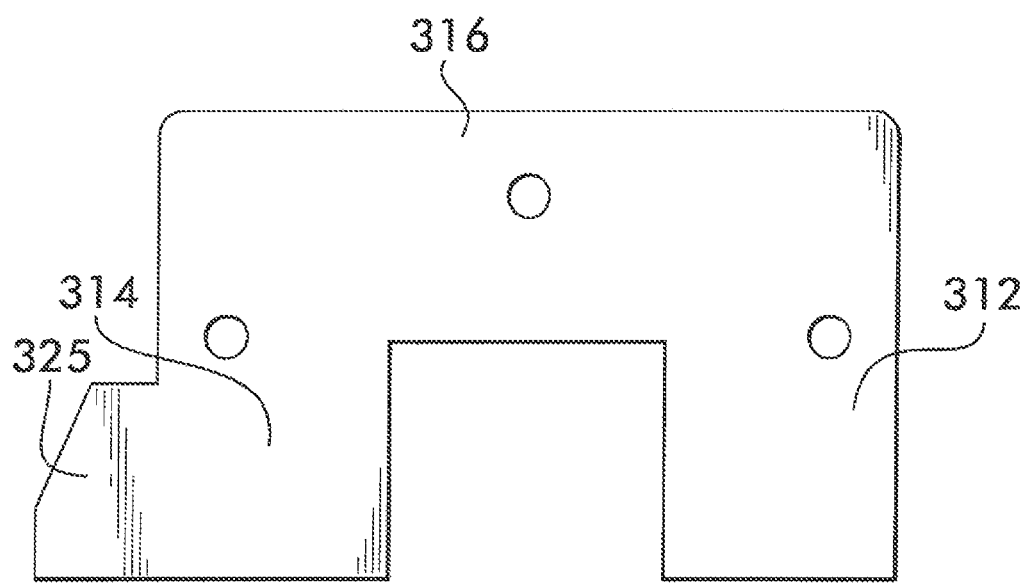
FIG. 11 is a view similar to FIG. 7, but illustrating an embodiment having only one camming lug.

Referring now to the drawings, FIG. 1 illustrates an overpressure valve assembly particularly suited for relieving tank overpressures in mobile tanks, such as railway tank cars. FIG. 1 is excerpted from U.S. Pat. No. 5,855,225, and the relevant disclosure of the structure contained in the '225 Patent is incorporated by reference herein for background purposes.

In actual practice, the spring mounting bracket assemblies illustrated in the '225 Patent have been modified in accord with FIGS. 2 and 3. As illustrated somewhat schematically in FIGS. 2 and 3, each of four bracket assemblies 50 (of which only two diametrically-opposed ones are shown) includes a pair of upstanding legs 52, 54 disposed in spaced parallel relation for receiving therebetween a constant force spring that rotates about an axle (not shown) extending horizontally through the aligned holes 55, 56. The legs 52, 54 are welded to the circular base plate 60. A cap mounting plate 62 is welded across the upper ends of the legs.

As illustrated in FIGS. 2 and 3, the prior art base plate included a continuous ring providing an opposing pair of arcuate diametrically-opposed valve guide portions 102 and 103. The valve guide portions have confronting tapered surfaces 102a, 103a projecting upwardly and outwardly from arcuate opposed surfaces that extend parallel to the central axis of the valve V for locating it precisely on its seat. In this prior art design, the arcuate valve guides 102, 103, are machined from a very thick base plate made necessary by the required height of the valve guides. Thus is time consuming and expensive. Also, in this prior art construction, when the valve V lifts off its seat due to an overpressure condition, the overpressure gas flow is deflected by the solid valve guides.

As will be discussed, infra., the present invention overcomes the limitations of this prior art structure.

To this end, the present invention provides a spring assembly and valve guide cradle 100 for securement to a valve mounting plate 105 that supports at least a pair of constant force spring assemblies operably connected to a moveable valve element V, shown in fragmental phantom lines in FIG. 5. Each spring assembly includes a one piece, preferably stainless steel, bracket 110 that has a pair of spaced apart upstanding legs 112, 114 and an integral base portion 113, which form a U-shape in vertical elevation. Each of the legs has a predetermined width dimension with end portions 112a and 114a remote from the base 113. A flat tie plate 116 is welded across the legs adjacent their end portions for tying the legs together and for providing a cap mounting hole 116a. The valve mounting plate 105 and the bracket 100 are both formed of rolled stainless steel material, and they are welded together at the bracket base by weldments 120, 122.

The bracket 110 is preferably formed of a rectangular piece of stainless steel plate shown in FIG. 4 which is, bent about the bend lines B, B into the U-shape shown. After being thus formed, the leg tying plate 116 is welded across the legs 112, 114 while they are captured in a jig to maintain their parallelism. This two-piece welded bracket is then provided with aligned spring axle holes 112b, 114b in the legs. The spring bracket cradle assembly 100 is then welded to the valve base plate 105 at a precise location.

According to the present invention, the valve guides are formed integrally with the spring assembly cradle. Not only does this eliminate the costs associated with machining away metal from a thick base plate blank, but it also provides another pair of lateral gas out-flow paths to afford better out-flow under overpressure conditions.

In order to form the valve guides, a blank of cold-rolled steel is cut, as by water jet, into the configuration illustrated in FIG. 5. As shown, the blank is elongate and has a pair of identical lateral camming lugs 125, 126 each of trapezoidal shape configured such that when the blank is formed into its U-shape, the inclined camming lugs 125 and 126 define a pair of camming surfaces 125*a*, 126*a*. Opposed slots 127, 128 are disposed between the base portions of the trapezoidal camming lugs to enable the bracket legs to be bent readily into the U-shaped configurations shown. The camming surfaces cooperate with a like pair on the opposite spring bracket cradle to guide the valve V downwardly and laterally in its substantially vertical path of movement into the normally closed position, as shown in FIG. 6 in phantom lines.

FIGS. 7, 8, 9 and 10 illustrate a modified embodiment of the one-piece bracket illustrated in FIGS. 4, 5 and 6, but having certain additional advantages. For instance, in the FIGS. 7-10 embodiment, there is no need to weld a separate tie plate across the upper ends of the legs. Rather, in this embodiment, the laser-cut blank is shaped so that the tie plate 216 is integral with the legs 212 and 214 and is disposed above the lower ends of the legs adjacent the upper ends of the legs so that the bracket has a U-shaped profile in horizontal plan, i.e. as seen FIG. 8 which is a view looking downward in FIG. 9. This modified embodiment is less labor intensive to manufacture because it obviates the separate tie plate and welding step required in the first-mentioned embodiment. The camming lugs 225 and 226 are integral with both legs.

FIG. 11 illustrates a further modified embodiment of the invention wherein only one of the legs 314 of the blank depicted in FIG. 7 has a camming lug 325, and the other leg 312 is devoid of a camming lug. There may be applications where only a single camming lug can provide a desired result thereby further minimizing production costs.

From the foregoing, it should be apparent that the present invention provide an improved spring mounting bracket and valve guide assembly that is less expensive to manufacture and that, when installed, affords additional areas of exhaust for any gas discharged during an overpressure event that may causes the valve to open.

While a preferred embodiment of the invention has been described in detail, various modifications, alterations and changes may be made without departing from the spirit and scope of the invention as defined in the appended claims.

The invention claimed is:

1. A cradle for mounting a constant force spring in a pressure relief valve assembly comprising:

a one piece bracket having a pair of spaced apart upstanding legs, at least one of said legs having a predetermined width dimension with a camming lug portion adjacent one end thereof, and a tie plate extending across the legs adjacent end portions thereof for tying the legs together in spaced parallel relation.

2. A pressure relief valve assembly for venting overpressures in a tank, comprising:

a valve mounting plate for attachment to a tank, said valve mounting plate supporting at least a pair of constant force spring assemblies operably connected to a moveable valve element, each spring assembly having a one piece bracket, said bracket having a pair of spaced apart upstanding legs, at least one of said legs having a predetermined width dimension with a camming lug portion adjacent an end portion thereof, and an integral tie plate extending across the legs adjacent their end portions for tying the legs together, said valve mounting plate and said bracket being of steel and being welded together at said bracket base.

3. A pressure relief valve assembly for venting overpressures in a tank, comprising:

a valve plate for attachment to a tank, said valve mounting plate supporting at least a pair of constant force spring assemblies operably connected to a moveable valve element, each spring assembly having a one piece stainless steel bracket, said bracket having a pair of spaced apart upstanding legs and an integral base portion, at least one of said legs having a predetermined width dimension with a camming lug portion adjacent said base, and a tie plate extending across the legs adjacent end portions thereof for tying the legs together, said valve mounting plate and said bracket being of rolled stainless steel material and being welded together at said bracket base.

4. Apparatus according to any one of claims 1-3 wherein said bracket has a U-shaped configuration in vertical elevation and said tie plate portion extends across the legs adjacent their lower end portions.

5. Apparatus according to any one of claims 1-3 wherein said bracket has a U-shaped configuration in plan and said legs are separated adjacent their lower end portions, and said tie plate portion extends across the legs above their lower end portions.

6. Apparatus according to any one of claims 1-3 wherein said tie plate extends across the legs opposite said camming leg portion thereof.

7. Apparatus according to any one of claims 1-3 wherein each of said lugs has a camming lug portion adjacent the lower ends thereof.

* * * * *